Sept. 3, 1935.　　　　E. R. FELLOWS　　　　2,013,557
WORKHOLDER FOR GEAR GENERATING MACHINES
Filed March 15, 1932　　　7 Sheets-Sheet 3
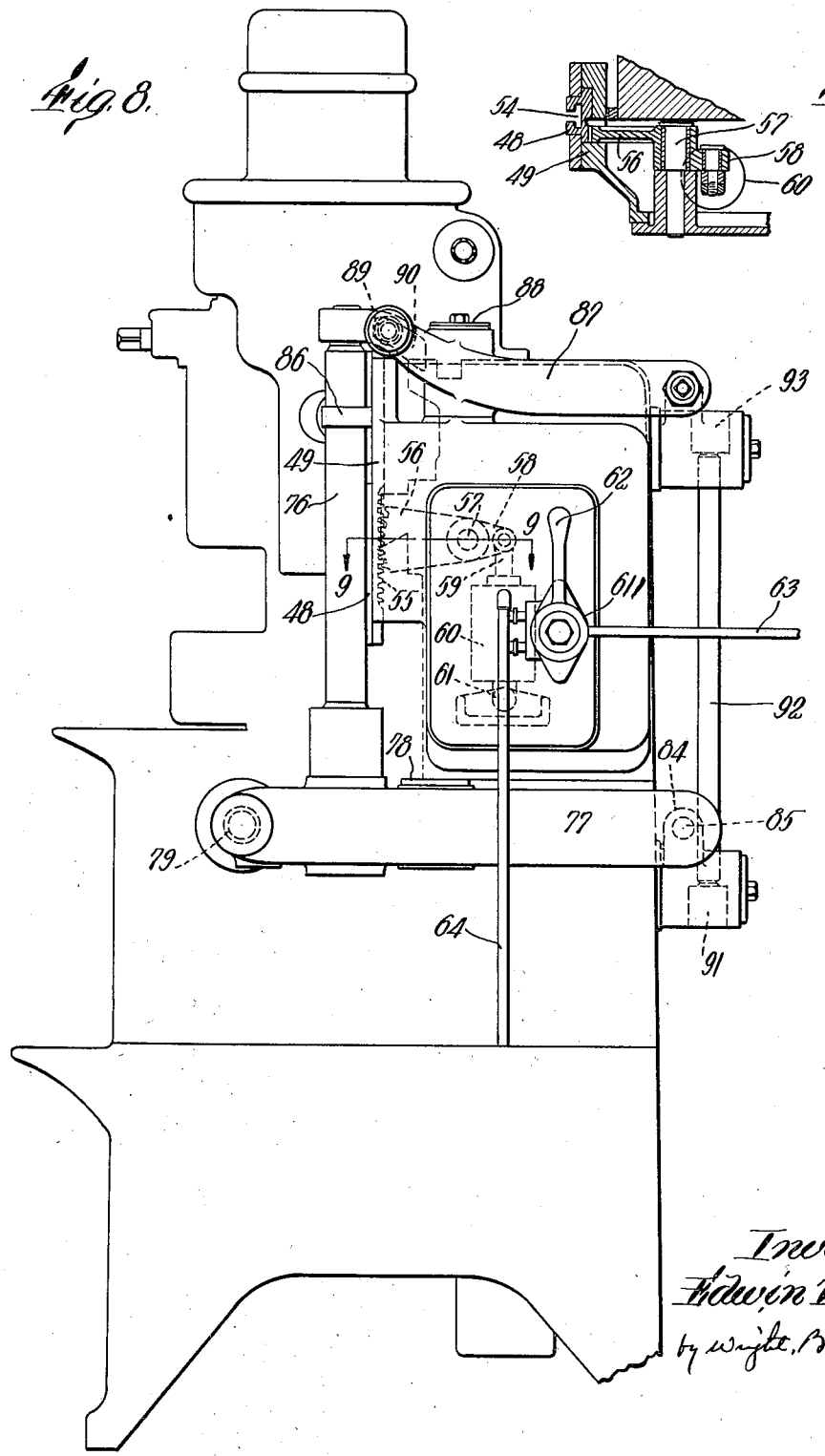

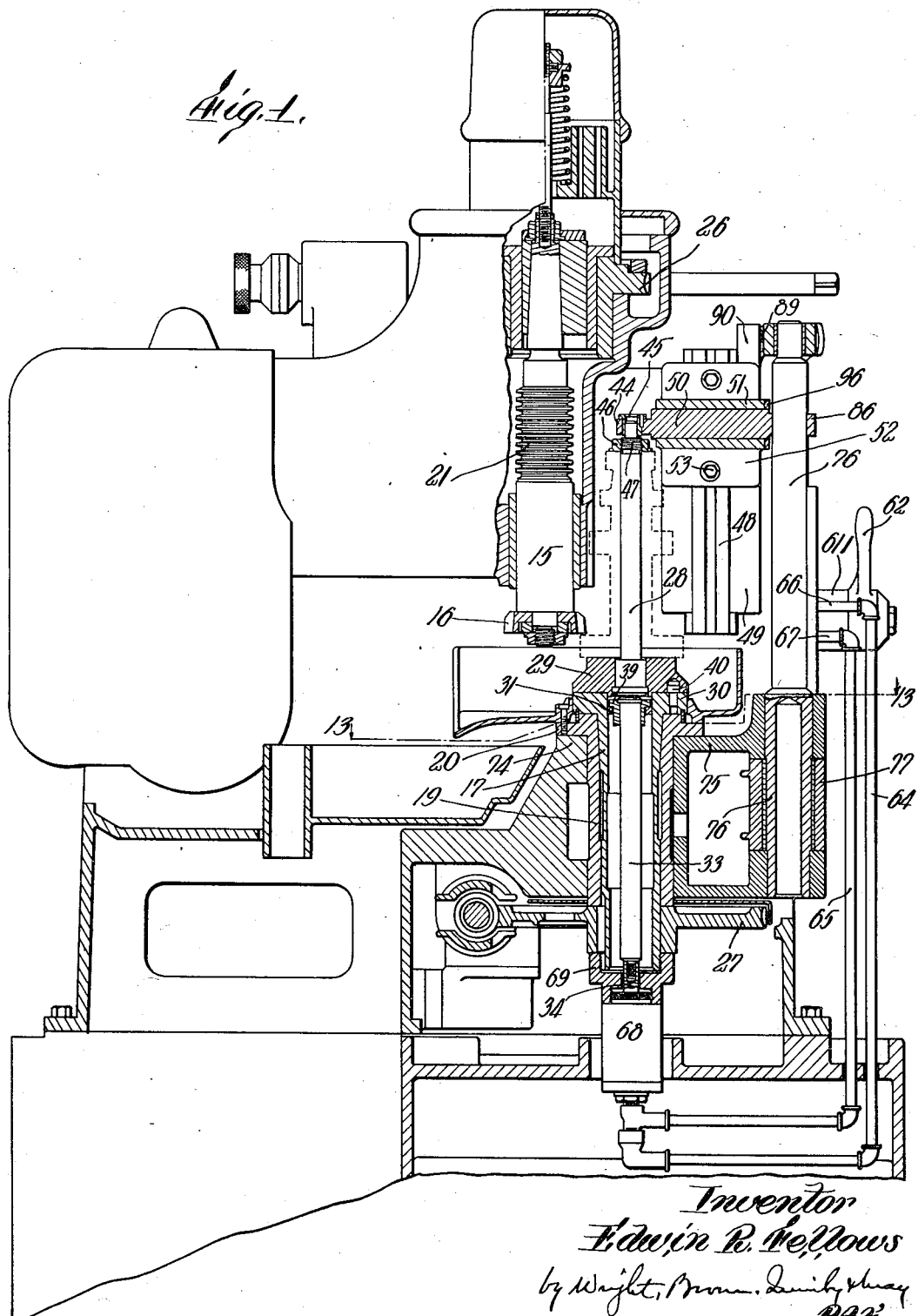

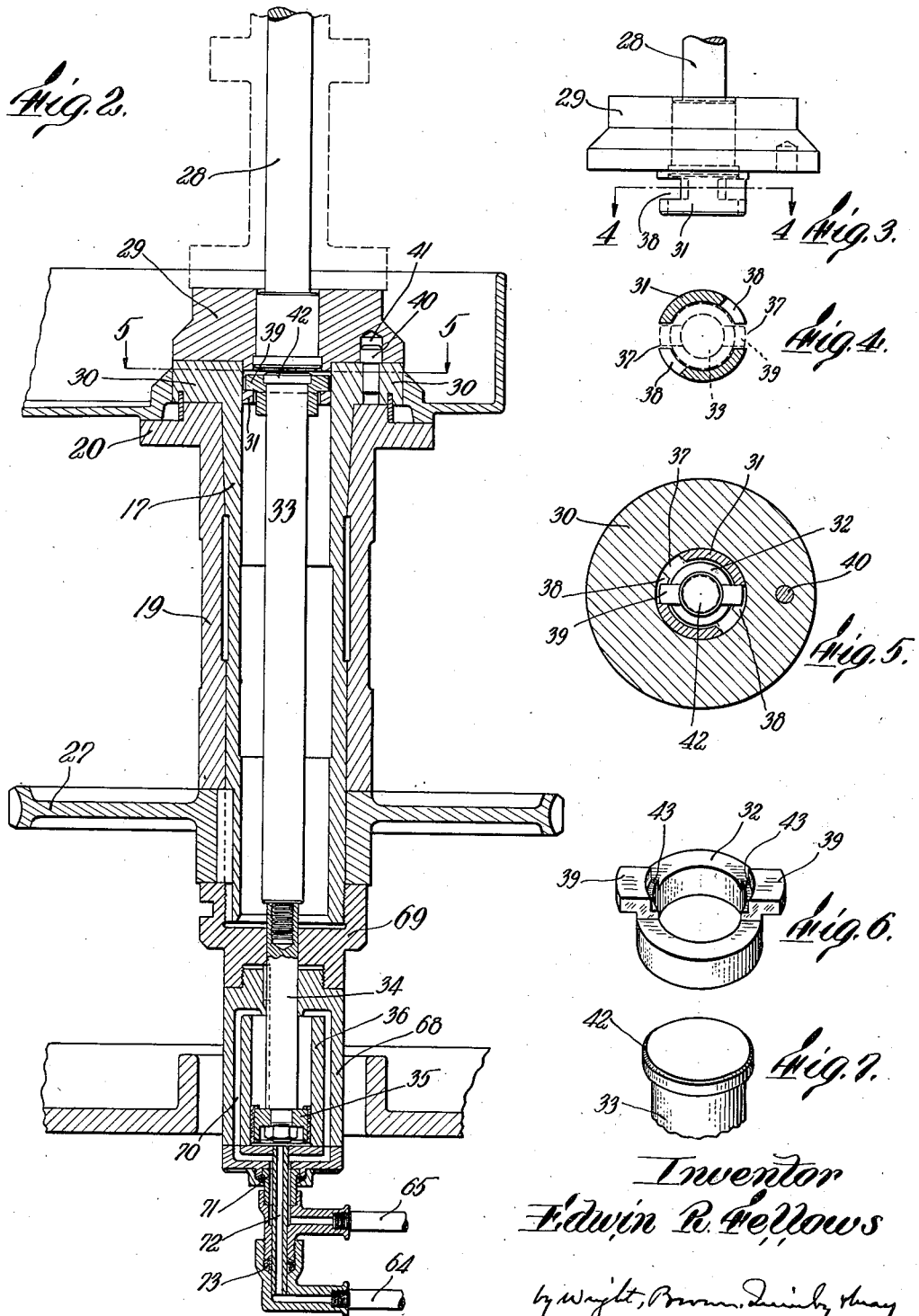

Sept. 3, 1935.  E. R. FELLOWS  2,013,557
WORKHOLDER FOR GEAR GENERATING MACHINES
Filed March 15, 1932   7 Sheets-Sheet 4

Inventor
Edwin R. Fellows
by Wright, Brown, Quimby & Way
Attys.

Patented Sept. 3, 1935

2,013,557

UNITED STATES PATENT OFFICE 2,013,557

WORKHOLDER FOR GEAR GENERATING MACHINES

Edwin R. Fellows, Springfield, Vt., assignor to The Fellows Gear Shaper Company, Springfield, Vt., a corporation of Vermont Application March 15, 1932, Serial No. 598,892

12 Claims. (Cl. 90—9)

The present invention relates to gear generating machines of the type in which a planing cutter having the outline of a gear is caused to generate teeth in a work piece by relative reciprocation in the axial direction between cutter and work piece, and simultaneous rotation of cutter and work piece in the manner of a pair of gears rolling in mesh. Machines of this type are illustrated in prior patents of mine, including No. 1,478,472, December 25, 1923; and No. 1,662,109, March 13, 1928. The object of the new step herein disclosed and claimed is to provide an improved work holder which can be easily and quickly applied to, and detached from, the work spindle, carrying the work with it, and a displaceable securing and steadying means for such holder, and for holders of other kinds.

In the present embodiment, the work holder is an arbor detachably connected with the work spindle proper which is normally a permanent part of the machine assembly. Its end remote from such spindle is supported by rigid means which maintain the arbor in the desired alinement but are detachable to permit removal of the arbor, or application and removal of work pieces. A further feature of the invention comprises the movement of the last named means simultaneously with that of the spindle for backing off the work from the cutter after each cutting stroke and returning it to operative position before the next cutting stroke. The above mentioned features and characteristics, together with related features described in the following specification, and all their substantial equivalents, in all combinations and environments wherein they are capable of beneficial use, constitute the invention which I will now more fully describe and claim.

A machine containing one of the possible embodiments of the invention is shown in the accompanying drawings, in which,—

Fig. 1 is in part a front elevation, and in part a vertical section through the cutter and work spindles, of such machine;

Fig. 2 is a detail sectional view on an enlarged scale of the work spindle and work holding arbor of the machine;

Fig. 3 is a side elevation of the face plate and clutch portion of the work arbor;

Fig. 4 is a detail sectional view on line 4—4 of Fig. 3;

Fig. 5 is a cross section on line 5—5 of Fig. 2;

Fig. 6 is a perspective view of one of the elements of the arbor connecting clutch;

Fig. 7 is a perspective view of the head on the tension rod which carries said clutch member;

Fig. 8 is a side elevation as seen from the right of Fig. 1;

Fig. 9 is a detail sectional view taken on line 9—9 of Fig. 8;

Like reference characters designate the same parts wherever they occur in all the figures.

The invention is here shown for illustration in connection with a standard commercial gear shaping machine manufactured under the patents hereinbefore mentioned. Inasmuch as the provisions in such machine for reciprocating the cutter, generatively rotating the cutter and work, and feeding the cutter to depth in the work are all standard, and are not affected by the new invention here disclosed, I have limited the detailed showing of the drawings to those features only which are necessary to an explanation of the new steps and features, and for the rest have shown simply the external outlines of the machine.

Figure 12:
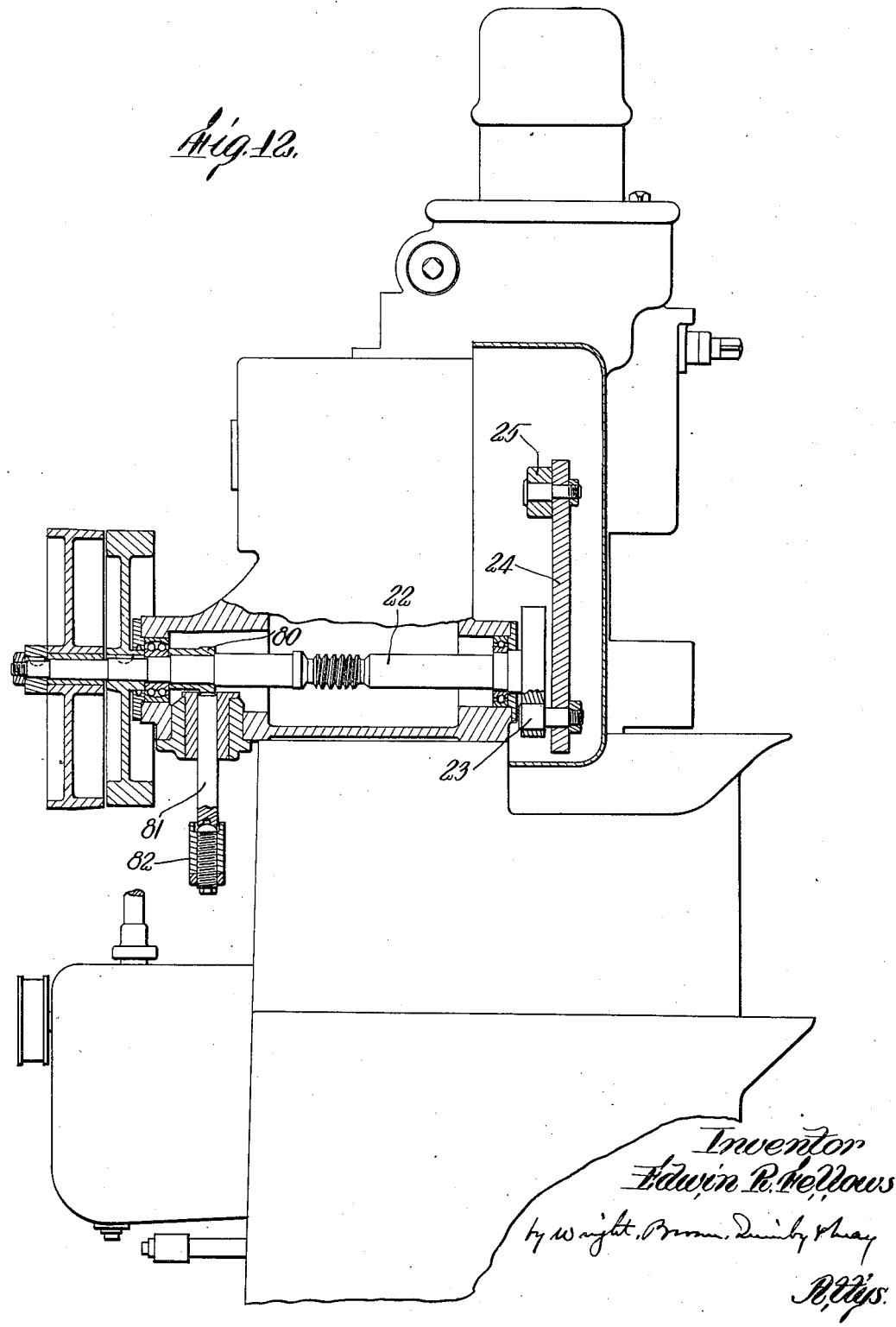
Fig. 12 is a left hand elevation, shown partly in section as cut away on line 12—12 of Fig. 10.

By way of general explanation, it will be sufficient to say that 15 represents the reciprocative and rotatable tool spindle carrying a gear shaping cutter 16; that 17 represents a tubular work spindle rotating in a bearing 19 in an apron 20; that the cutter spindle is reciprocated by an oscillative gear segment (not shown) meshing with rack teeth 21 surrounding the spindle and driven from the main shaft 22 (Fig. 12) by a crank 23, connecting rod 24, and lever arm 25; and that the cutter and work spindles are rotated at the proper speed in the proper directions by worm and wheel gearing (respectively the worm gears 26 and 27) from the main shaft 22; all substantially as disclosed in full in my said prior patents, and therefore unnecessary to be further described herein.

The common means heretofore used for mounting gear blanks on the work spindles of such machines has been a tapered arbor applied and secured in a socket in the spindle, in such manner as to make the arbor virtually a part of the spindle. The work piece has been placed on such arbor and secured by a nut screwed on the end of the arbor and pressing on the work through an interposed washer. This practice has necessitated stoppage of the machine when the work is changed, for a time long enough to unscrew and remove such nut, remove the finished gear, apply a new blank, and replace and tighten up the nut. Such arbors also are unsupported and uncontrolled at the outer end. In the case of long arbors, such as are used when long gears or those having a long hub, or unit assemblages of a number of gears in tandem, are being cut, this lack of control may permit more or less deflection of the arbor, with possible inaccuracy in the dimensions of the finished gear, particularly if the gear element being cut is located near the outer end of the arbor. I have by the present invention made provisions for loading and unloading the arbor apart from, and during the operating time of, the machine, and provided an outer support for an arbor of any length. The arbor 28 shown in the drawings is a relatively long one designed to take the counter shaft gear assemblage of the standard automobile transmission (shown in dotted lines in Figs. 1 and 2).

This arbor is provided with a fixed face plate or head 29 having a bottom surface finished square to the axis of the arbor and adapted to rest on the complementally finished top surface of a flange 30 on the upper end of the tubular work spindle 17. Such face plate carries one member 31 (Fig. 3) of a bayonet joint clutch arranged to enter the bore of the spindle. The complemental member 32 (Fig. 6) of this clutch surrounds and is made fast to the end of a tension rod 33 which passes coaxially through the spindle and is made fast at its lower end to the piston rod 34 of a double acting piston 35 operating in a pneumatic cylinder 36. Clutch member 31 is a tubular extension of the face plate 29, coaxial with the arbor, and accurately fitted to the bore of the spindle. It has two axial slots 37, opposite to one another, opening from its lower end and joining lateral slots 38. The complemental clutch member 32 is adapted to enter the bore of the member 31 and carries lugs 39 on opposite sides of suitable shape and dimensions to pass through the axial slots 37 into the lateral slots 38. The arbor is accurately positioned and centered in axial alinement with the spindle by means of the faceplate and clutch member 31, and is rotated with the spindle by a pin 40 set into the spindle flange 30 and entering a complemental socket 41 in the face plate. The tension rod 33 is caused by pneumatic pressure exerted on the upper end of piston 35, to hold the face plate in close and firm contact with the spindle flange. A flange 42 on the end of the tension rod, overlapping shoulders 43 on the clutch member 32, makes a positive interlock to prevent stripping of the clutch member under tension; while friction prevents it from sliding down the rod. By reversing the pneumatic pressure, in a manner later described, so as to be applied to the piston from beneath, the tension rod is raised and acts as an ejector to separate the arbor from the spindle and expose the clutch above the end of the spindle.

The free end of the arbor is supported and steadied by a socketed arm 44 which receives the extremity of the arbor. Preferably the socket of said arm is provided with a bushing or liner 45 accurately fitted to the arbor extremity, and the latter is made of small enough diameter to permit application and removal of the work clamping nut 46 on the threaded part 47 of the arbor without injury to such extremity. Arm 44 is carried by a slide 48 which is movable parallel to the arbor in a guide 49 on a stationary part of the machine frame. In this illustration the arm 44 is a structural part of a cross slide 50 which is movable in a guide 51 perpendicular to the direction of the arbor, for a purpose later described which may be disregarded for the present. Guide 51 is part of a plate 52 having bolts 53 of which the heads are contained in a T-shaped slot 54 in the outer face of slide 48. In effect, so far as this phase of the invention is concerned, the supporting arm is a part of plate 52 and is adjustable therewith along the slide 48 to accommodate arbors of various lengths.

Slide 48 is provided and moved at the necessary times to engage the supporting arm with, and disengage it from, the extremity of the arbor. Said slide is engaged by means of rack teeth 55 on its back (Figs. 8 and 9) with a gear segment 56 which is mounted on a fixed pivot stud 57 and carries an arm 58 coupled with the rod 59 of a piston operating in a pneumatic cylinder 60. This cylinder is connected with the machine frame by a pivot 61 to accommodate the curved line motion of the arm 58.

A control valve 611 having a handle 62 is interposed between a supply pipe 63 for the working fluid and pipes 64, 65 coupled to opposite ends of the cylinder 36, and pipes 66, 67 coupled with opposite ends of cylinder 60. The control valve connections, and pneumatic cylinders are organized to raise the arbor support 44 at the same time that the arbor is raised, but to a greater distance so as to release the arbor, and vice versa. As shown, this result is accomplished by making segment lever arm 56 substantially longer than arm 58, while providing substantially equal piston travel, in both cylinders, but it may be done in other ways. A standard commercial form of control valve is shown here, and requires no detailed description.

The cylinder 36 for operating the arbor holding and ejecting rod, is made as a liner or inner sleeve within a housing 68, coupled to the lower end of the work spindle 17 by a double nut 69, so that it rotates with the spindle. The interior ports 70 which lead pressure fluid to the top side of the piston communicate with the pipe 65 through a packed swivel coupling 71. An inner pipe 72 leads to the lower end of the pressure cylinder and has a packed swivel connection at 73 with the fitting to which the supply pipe 64 is connected. The piston rod 34 is restrained from rotation relatively to the cylinder, by a spline or other suitable means, so as to maintain the same angular relationship between the clutch lugs 39 and the driving pin or stud 40.

The work is backed off to avoid rubbing contact with the cutter during the non-operative return strokes of the latter, by movement bodily of the apron in which the work spindle has its bearing. This apron has a flange portion at its upper end, to which the numeral 20 is applied resting on a horizontal surface 74 of the machine base, and a tubular body, to which the numeral 19 is applied, which seats in a complemental recess in the base, and to which is secured a massive rigid arm 75 connected by a pivot pin 76 with a lever 77. This lever is coupled by a pivot 78 with the machine base and carries in one arm a spring 79 which presses against the base and tends to withdraw the apron from its seat and from the work spindle axis. Its other arm is acted upon in time with the reciprocations of the cutter spindle by a cam 80 on the main shaft through a linkage consisting of push rod 81, bell crank lever 82, rod 83, lever arm 84, and rod 85, so as to move the apron against its seat before, and hold it there during, each cutting stroke. This means is essentially like that shown in the patent to E. W. Miller, No. 1,802,181, April 21, 1931, for a similar purpose, which, however, lacks the lever arm 84 interposed between rod elements 83 and 85.

In the present machine the arbor support 44 is also moved in unison with the apron, for which purpose said support is carried by the cross slide 50 previously mentioned. The pivot 76 is extended upwardly from lever 77 to a height above the highest adjusted position of the cross slide, and is made with an accurately finished cylindrical surface in its extension which passes through an accurately fitted eye 86 on the outer end of slide 50, to a connection at its upper end with one arm of a lever 87. Said lever is connected to the machine frame by a pivot 88 so as to swing about an axis parallel with that of the pivot of lever 77. Its arm which is engaged with rod 76 carries a spring 89 reacting against a stationary shoulder 90 of the frame and having a similar function to that of spring 79; and the other arm of lever 87 receives thrust from the rod 83 through lever arm 84, a second arm 91 on the same bell crank lever, a push rod 92, a bell crank lever 93, 94, and a push rod 95.

Figure 10:
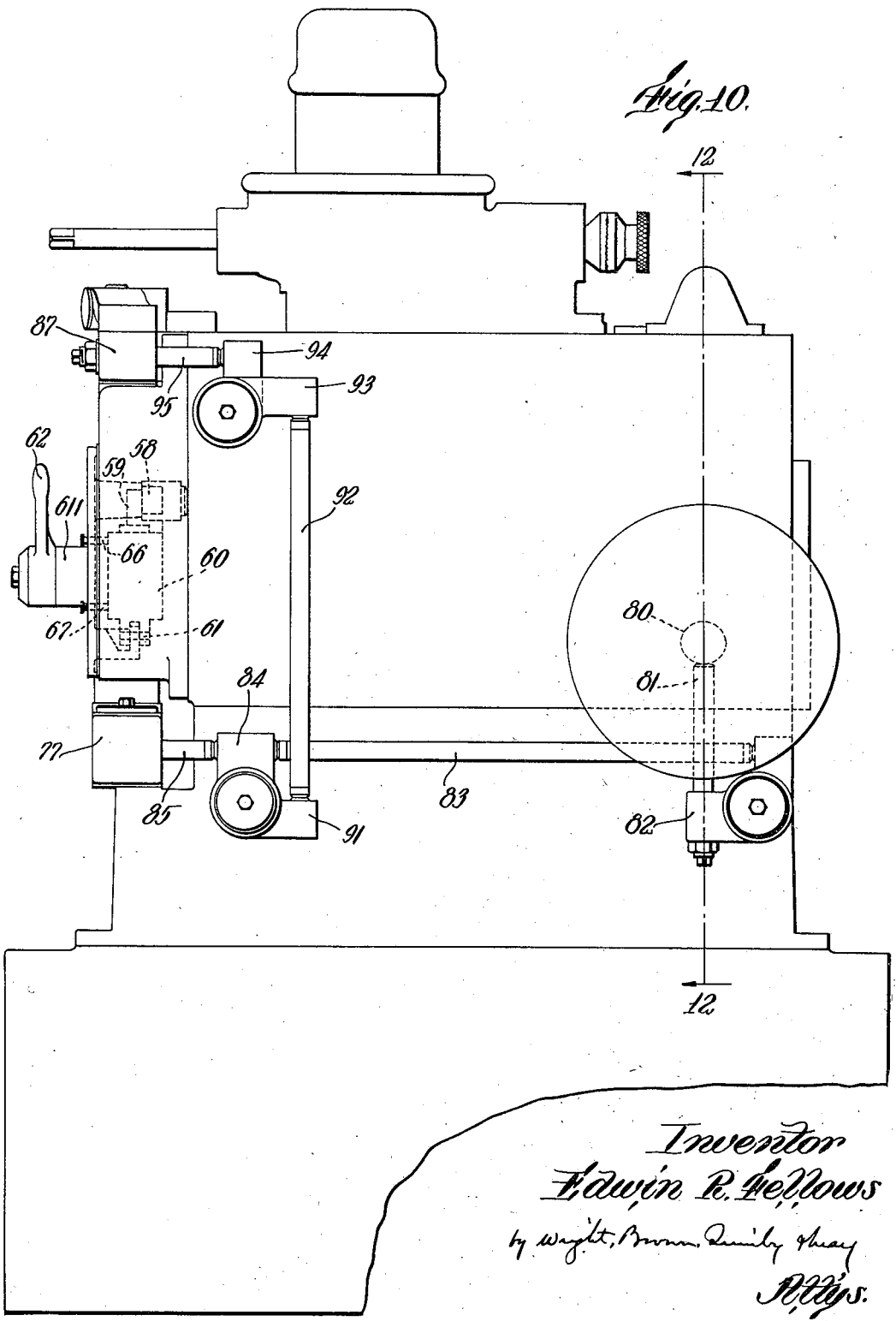
Fig. 10 is a rear elevation.
Figure 11:
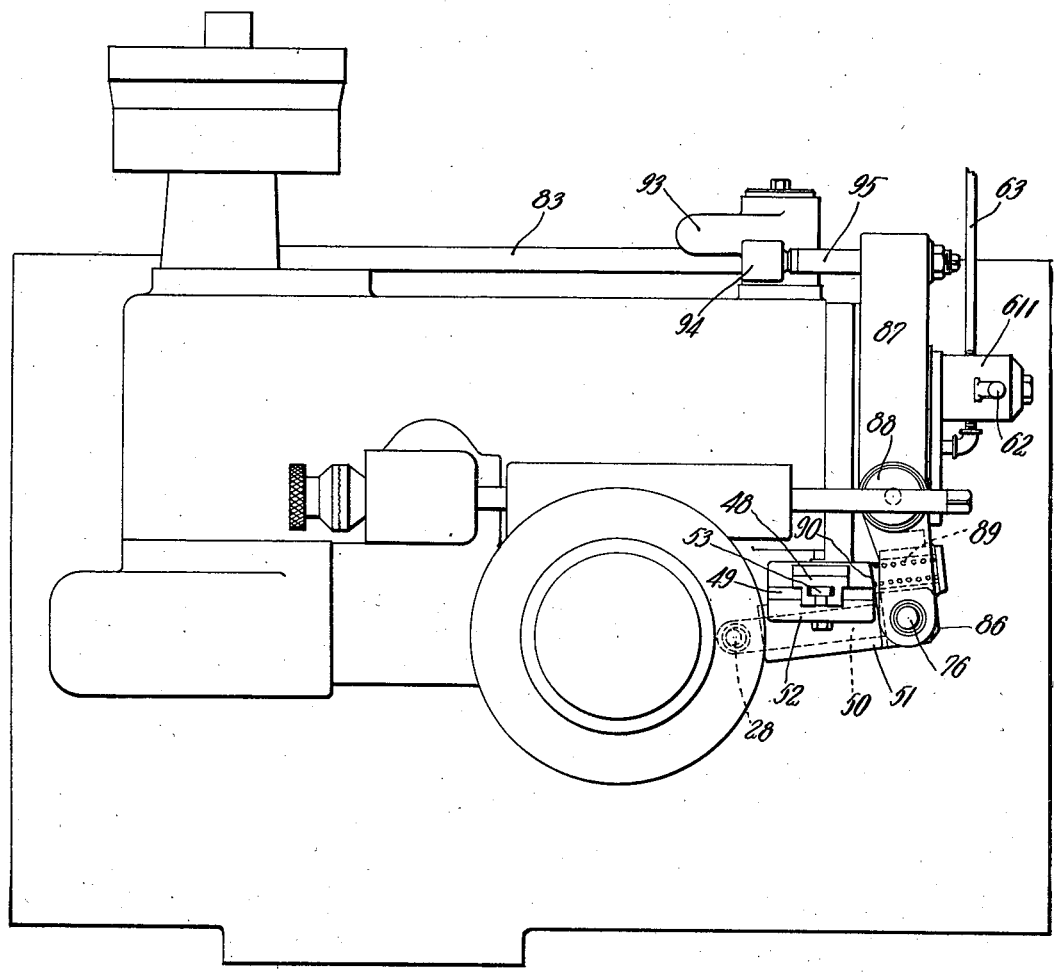
Fig. 11 is a plan view of the machine.
Figure 13:
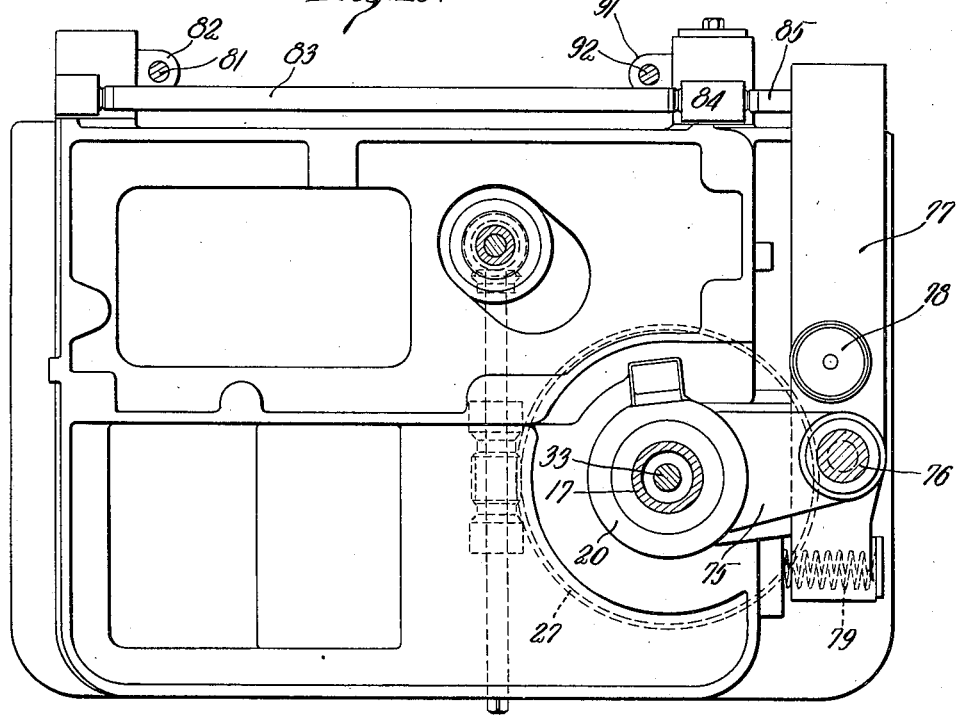
Fig. 13 is a plan view of the parts of the machine below line 13—13 of Fig. 1 and a sectional view of the parts cut by such line.

The arbor support is located in exact alinement with the spindle axis by a positive stop, which here is a collar 96 properly fixed on the cross slide 50 to abut against the adjacent end of the guide 51; this stop being effective at the same time that the apron is brought against the complemental seat in the machine base. Equal movement of the spindle apron and arbor support in backing off is accomplished by appropriate design of the several levers, in respect to the length of their respective arms, location of their fulcrum axes, etc., due compensation being made for possible spring and give of the bearings and transmission connections. It will be noted in Figs. 11 and 13 that the lever arms which are connected respectively to the link 75 and slide 50 are perpendicular to the direction in which the spindle is required to move in being backed off; this direction being at an inclination to the line of centers of the cutter and work spindles, as is well understood by those familiar with the art of cutting gears by the shaping method. The movements of the apron in backing off, and of the air cylinder 60 in setting and releasing the holding arm 44, are accomplished without disturbance of the pipe system for the pressure fluid, because in the first place these movements are short, and in the second place the pipe system is set up with flexibility, or capacity for elastic yielding according to well known principles.

In the use of this invention two or more arbors of the character here described are provided with one machine, and the work is changed on the idle arbor or arbors while the gear on the active arbor is being cut. On completion of the cutting cycle, when the machine automatically stops, the attendant grasps the work piece or the arbor with one hand, while turning the valve handle 62 with the other hand to cause release of the arbor. When the steadying support and the arbor have been raised, as previously described, the attendant disengages the bayonet joint clutch, places the spare arbor on which a gear blank has previously been secured, in engagement with the clutch, reverses the valve, which causes the arbor to be positioned and secured, and starts the machine. While the next cutting cycle proceeds he unloads and reloads the arbor just removed from the machine, in preparation for the next change of work.

Obviously modifications and variations in the parts and combinations herein disclosed may be made without departure from the invention. Thus, for instance, the holding means for the outer end of the arbor may be used without the provisions for backing off movement in any case where the backing off on return strokes is performed by the cutter holder instead of the work holder. Also the principles of this invention are not limited to a machine in which the spindles are vertical or where the arbor is mounted to protrude from the upper end of the work spindle. Hence the terms used in the foregoing specification to indicate position and directions relative to the horizontal plane are to be understood as descriptive of the illustration herein and not limiting of the scope of the invention. Also other than pneumatic means may be applied to secure and release the arbor; i. e., mechanical means may be so applied, or liquid may be used instead of air in the fluid system here shown.

It will be understood that the devices here shown, and their equivalents, may be used with a machine which is adjustable, or otherwise designed, to cut any one of the gears of the assemblage indicated by broken lines in Fig. 1, instead of the lowermost gear of that assemblage, or a gear of any other character which may be located for any reason at a distance from the end of the spindle.

What I claim and desire to secure by Letters Patent is:

1. In a machine tool, a tubular spindle, an arbor having a face plate adapted to abut against the end of such spindle, a tension rod within the spindle, a quickly detachable clutch for connecting said tension rod and arbor together, and reversible means for applying force to said rod in opposite directions alternately, whereby to pull the arbor face plate against the spindle and to displace it therefrom respectively.

2. In a machine tool having a tubular work spindle, a work holding arbor, a tension rod within the spindle, complemental clutch members of the bayonet joint type on the arbor and tension rod for detachably coupling them together, and a double acting fluid operative piston connected with the tension rod for causing the latter to secure the arbor to, and release it from, the spindle.

3. A gear shaping machine comprising spindles for cutter and work arranged to rotate on parallel axes and being located at respectively opposite sides of a plane perpendicular to such axes, the work spindle having a plane surface perpendicular to its axis at the end next to the cutter spindle, a work arbor having an end face perpendicular to its axis and a clutch member adjacent to the same end, a tension rod contained and movable endwise within the work spindle having a complemental clutch member for quickly detachable connection with the clutch member of the arbor, and means for operating said rod so as, when thus coupled with the arbor, to hold the before mentioned plane surface of the arbor forcibly against the end surface of the spindle.

4. In combination with a machine tool having a rotatable work spindle, a detachable work arbor, clutching means for connecting one end of the arbor to the spindle, a centering support for the opposite end of the arbor, and means for moving said clutching means and support longitudinally of the spindle in opposite directions, but both in the same direction at one time, for connecting and disconnecting the arbor with and from the spindle.

5. In a machine tool, a tubular spindle having an interior tension rod, a separate work arbor applicable to one end of the spindle, clutching means for connecting the arbor detachably to the tension rod, a support for the end of the arbor remote from the spindle movable in the axial direction of the spindle for engaging and disengaging the arbor, and means for simultaneously moving the tension rod and support outwardly from the spindle to release the arbor.

6. In a gear shaping machine having a rotatable and endwise reciprocatable cutter spindle, a rotatable work spindle parallel to the cutter spindle, and means for moving the work spindle laterally for backing off the work, a work arbor connected to the spindle to protrude therefrom, an arbor support engaging the arbor at a distance from the end of the spindle, and means for moving said support simultaneously and equally with the spindle in the lateral movements thereof.

7. A gear shaping machine having a rotatable work spindle, an apron supporting said spindle and being movable transversely to the axis thereof for backing off the work, an arbor carried by the work spindle and protruding therefrom, a support for the outer end of the arbor shiftable longitudinally of the spindle for engaging and disengaging the arbor, and means for moving said support equally with the apron and in the same direction at the same time.

8. In a gear shaping machine, a work spindle, an apron in which said spindle is rotatably mounted, said apron being movable transversely to the axis of rotation of the spindle for backing off the work, an arbor detachably secured to the spindle and protruding from one end thereof, a slide movable in a stationary part of the machine longitudinally of the spindle, a cross slide carried by the first named slide having a supporting bearing for the arbor and extending thence in movably guided connection with the first slide in the same direction as that of the backing off movement of the apron, and means connected to the apron and cross slide and operable to give equal and simultaneous backing off movement thereto.

9. A gear shaping machine having a rotatable work spindle, an apron in which said spindle is mounted, arranged with provision for backing off movement transversely to the axis of the spindle, an arbor detachably connected with the spindle and projecting from one end thereof, a lever pivoted to the machine so as to swing in the plane of movement of the apron, a pivot rod carried by said lever parallel to the spindle, a second lever parallel to the first lever and engaged with said pivot rod, a connection from the pivot rod to the apron, a support for the outer end of the arbor engaged with the pivot rod to slide longitudinally thereof, and a carrier for the arbor support mounted to slide parallel with the spindle axis to engage and disengage the arbor support with and from the arbor, and with which the arbor support has a sliding engagement in the direction of backing off movement.

10. A gear shaping machine having a rotatable spindle, an apron in which said spindle is mounted and which is itself movable transversely to the axis of the spindle for backing off the work, an operating lever for said apron, an arm fixed to the apron, a pivot pin connecting said arm and lever and extending therefrom parallel to the spindle and beyond the end thereof, a second lever engaged with the outer end of said pivot rod and movable in parallel with the first lever, an arbor detachably connected with the spindle and projecting therefrom parallel to said pivot rod, a slide mounted on the machine to move parallel with the spindle and arbor, and a cross slide carried by the before named slide and movable transversely to the movement thereof, said cross slide having an arbor support engageable with the outer end of said arbor and having also an eye which embraces and is slidable on the said pivot rod.

11. In a machine tool, a tubular spindle having an interior tension rod, a separate work arbor applicable to one end of said spindle, complemental quickly detachable coupling means between said spindle and said rod, operator controlled means for moving said rod in one direction to secure the arbor, and for moving it in the opposite direction to release the arbor, a support for the arbor remote from said spindle, and means under the same operator control as said tension rod organized to move said support simultaneously with, and in the same direction as, the tension rod, and through a wider distance.

12. In a machine tool, a rotatable work spindle, a separate arbor having an end face adapted to abut against the contiguous end of the spindle, a tension rod movable endwise within the spindle and adapted to be projected from the end of the spindle to which the arbor is applied, said rod and the arbor having complemental clutching means constructed to be engaged and disengaged with a fractional part of a single rotation of one relatively to the other when the rod is so projected, and means for withdrawing the rod endwise to force the said face of the arbor against the spindle end.

EDWIN R. FELLOWS.